(12) United States Patent
Croxford et al.

(10) Patent No.: US 7,640,397 B2
(45) Date of Patent: Dec. 29, 2009

(54) ADAPTIVE COMPARISON CONTROL IN A MEMORY

(75) Inventors: Daren Croxford, Burwell (GB); Timothy Fawcett Milner, Cherry Hinton (GB)

(73) Assignee: ARM Limited, Cambridge (GB)

( * ) Notice: Subject to any disclaimer, the term of this patent is extended or adjusted under 35 U.S.C. 154(b) by 383 days.

(21) Appl. No.: 11/545,758

(22) Filed: Oct. 11, 2006

(65) Prior Publication Data

US 2008/0091882 A1 Apr. 17, 2008

(51) Int. Cl.
*G06F 13/00* (2006.01)
(52) U.S. Cl. ......................................... 711/118; 711/3
(58) Field of Classification Search ................... 711/118
See application file for complete search history.

(56) References Cited

U.S. PATENT DOCUMENTS 4,996,641 A * 2/1991 Talgam et al. ............... 711/118
5,471,605 A * 11/1995 Ruby .......................... 711/118
5,845,325 A * 12/1998 Loo et al. .................... 711/135
6,606,684 B1 * 8/2003 Ramagopal et al. ......... 711/118

OTHER PUBLICATIONS

M. Loghi et al, "Tag Overflow Buffering: An Energy-Efficient Cache Architecture" Proceedings of the Dsign, Automation and Test in Europe Conference and Exhibition (Date '05), 2005, Feb. 2005.
P. Petrov et al, "Data Cache Minimizations Through Programmable Tag Size Matching to the Applications" ISSS'01, Oct. 2001, pp. 113-117.

* cited by examiner

*Primary Examiner*—Reginald G Bragdon
*Assistant Examiner*—Larry T Mackall
(74) *Attorney, Agent, or Firm*—Nixon & Vanderhye P.C.

(57) ABSTRACT

A memory has multiple memory rows 32 storing respective stored values. The stored values are divided into portions which may be shared by all stored values within the memory rows concerned. When such portions are so shared, then the comparison between an input value and the plurality of stored values can be performed using a base value stored within a base value register 30 rather than by reading the relevant portions of the memory rows. Thus, those relevant portions of the memory rows can be disabled and power saved.

29 Claims, 6 Drawing Sheets

ADAPTIVE COMPARISON CONTROL IN A MEMORY

BACKGROUND OF THE INVENTION

1. Field of the Invention

This invention relates to the field of data processing systems. More particularly, this invention relates to memories within data processing systems and the adaptive control of comparisons performed with data stored in such memories.

2. Description of the Prior Art

Some memory associated with a processor consumes a significant proportion of the power consumption of that processor and memory combination. As an example, a processor core with a level one cache may have half of its power consumption associated with the level one cache. Perhaps 40% of the level one cache power consumption associated with cache TAG lookup operations. As the number of cache ways increases, the cache tag lookup consumption becomes greater. Such cache memories are desirable to achieve high performance operation and typically employ large fast and power hungry transistors and other circuit elements. It is also desirable to have a high capacity cache memory and these tend to be associated with high capacitance bit lines, which in turn increase our consumption.

As mentioned above, cache TAG lookup accounts for a significant proportion of cache memory power consumption. It has been recognised that in many circumstances, particularly in the embedded device market segment, the memory footprint (i.e. range of memory locations accessed) is frequently significantly less than the processor's address range. This is also a characteristic of high-end applications where wide 64-bit address space is provided, with relatively little of this address space in practise being used.

"TAG Overflow Buffering: An Energy-Efficient Cache Architecture" by Mirko Loghi, Paolo Azzoni and Massimo Poncino discloses a scheme in which an application program is profiled to determine the gross locality of the code concerned. The cache memory is then designed with a TAG width depending upon the profile results. A special register (the TAG Overflow Buffer (TOB)), is programmed with the current locality by the processor. Transfers that are within this region of memory are cached. Transfers from outside this region are not cached. This scheme requires that the cache be designed for a particular application (that is known in advance) and that software be written with the ability to update the TOB this scheme also results in lower performance (and higher power consumption) for transactions which fall outside the TOB region.

"Data Cache Energy Minimisation Through Programmable TAG Size Matching to the Applications" by Peter Petrov and Alex Orailoglu discloses a scheme in which the TAG length for a particular section of code is determined. This value is programmed into a register by a processor before the said section of code concern is executed. The scheme uses a special RAM array where bit lines can be disabled depending upon the value programmed into the register. This scheme requires the code to be analysed in advance and additional instructions to be written to program the TAG width (limiting where the scheme can be used). This scheme also reduces the processor performance due to the additional instructions that must be executed.

It will be appreciated that whilst the above schemes can exploit the address locality associated with many real life patterns of memory accesses, they suffer from the disadvantage that the application programs concerned must be modified to control the hardware in an appropriate manner for the application program concerned. This represents an additional burden to the programmer and means that the techniques cannot be used with existing legacy code.

SUMMARY OF THE INVENTION

Viewed from one aspect the present invention provides a memory comprising:

a plurality of memory rows;

comparator circuitry coupled to said plurality of memory rows and responsive to an input value to compare at least a portion of said input value with at least a portion of one or more stored values stored in respective ones of said plurality of memory rows so as to identify any memory row storing a stored value matching said input value;

write circuitry coupled to said plurality of memory rows to write respective stored values therein;

a base value register coupled to said comparator circuitry and storing a base value corresponding to at least a portion of at least one of said stored values; and comparator control circuitry coupled to said comparator circuitry to control:

(i) which portion of said input value is processed as a non-shared portion and compared by said comparator circuitry with non-shared portions of said one or more stored values stored in respective ones of said plurality of memory rows; and (ii) which portion of said input value is processed as a shared portion and compared by said comparator circuitry with a shared portion of said base value stored in said base value register; wherein said shared portion of said base value has a value matching corresponding portions of all of said stored values stored within said plurality of memory rows; and said non-shared portion of said input value has a value not matching corresponding non-shared portions of all of said one or more stored values stored within said plurality of memory rows.

The present technique provides a hardware controlled technique whereby comparator control circuitry in combination with a base value register is able to control which portions of an input value are compared with a base register value and which are compared with one or more stored values. Reducing the number of bits of the input value which have to be compared with one or more stored values reduces the power consumption of the memory. The comparision of the shared portion against the corresponding shared portion of the base value within the base value register is relatively power efficient comparison. However, a full comparison with up to the full stored values can be made if needed thereby avoiding a requirement for preprogramming or preconfiguring the memory based upon an analysis of activity yet to be performed. This enhances the generality and backwards compatibility of the technique.

The part of the base value which is used as the shared portion of the base value may be controlled in a variety of different ways including updating by the comparative control circuitry when a stored value is written to one of the rows of the memory.

It will be appreciated that the shared portion of the base value could in practice be formed of several groups of discrete bits within the base value depending upon the particular memory usage pattern encountered. However, more typical embodiments are ones which the shared portion of the base value is a contiguous portion thereof, in particular a high order bit portion thereof.

Whilst it will be appreciated that which portions of each memory row are treated as storing either a shared value or a non-shared value can be controlled on a bit-by-bit basis, hardware efficiencies may be achieved with little reduction in the power saved by employing embodiments in which each of the plurality of rows is divided into a plurality of multi-bit portions, each of the multi-bit portions being processed as storing either a shared stored value or a non-shared stored value for all of said plurality memory rows. It will be appreciated that the size of the multi-bit portions may be varied but depending upon the granularity it is desired to achieve in the control of the memory.

When the memory is divided into such multi-bit portions, a multi-bit portion can be selectively disabled by the comparator control circuitry from being subject to a comparison by the comparator circuitry, (and accordingly being read with the attendant energy consumption associated with such a read) when the multi-bit portion of all of the rows currently stored corresponds to at least a part of the shared portion of the base value.

Whilst it will be appreciated that the present technique has usefulness in a wide variety of memory systems, such as general purpose CAM memories, the technique is particularly useful when the memory is part of a cache memory, e.g. when the memory is a cache TAG memory. The power consumption of such cache TAG memories is increased in multi-way cache memory and accordingly the present technique is still more useful in this context.

The TAG memories may be separately provided for each way of the multi-way cache memory, or alternatively control may be simplified when the TAG memories are arranged such that for each portion of the stored values which can correspond to either a shared portion or a non-shared portion there is a separately provided TAG memory shared by all ways.

In order to adapt to the changing requirements of the memory, the base value is cleared when the cache memory is flushed. A base value may be set to match a first stored value written to the cache memory after such a flush.

The present technique is particularly suited to cache memories that are one of an instruction cache or a data cache within an Harvard architecture system as in this context a separation of instruction and data fetches improves the localisation of memory accesses within the memory space.

The present technique can be used for both physically and virtually addressed memories. The technique is particularly suited to virtually addressed memories as they are flushed more frequently.

Viewed from another aspect the present invention provides a method of operating a memory having a plurality of memory rows, said method comprising the steps of:

comparing at least a portion of an input value with at least a portion of one or more stored values stored in respective ones of said plurality of memory rows so as to identify any memory row storing a stored value matching said input value;

writing stored values to respective ones of said plurality of rows;

storing a base value corresponding to at least a portion of at least one of said stored values; and controlling which portion of said input value is processed as a non-shared portion and compared with non-shared portions of said one or more stored values stored in respective ones of said plurality of memory rows and which portion of said input value is processed as a shared portion and compared with a shared portion of said base value stored in said base value register; wherein said shared portion of said base value has a value matching corresponding portions of all of said stored values stored within said plurality of memory rows; and said non-shared portion of said input value has a value not matching corresponding non-shared portions of all of said one or more stored values stored within said plurality of memory rows.

Viewed from a further aspect the present invention provides a memory comprising:

a plurality of memory row means;

a comparator means coupled to said plurality of memory row means and responsive to an input value for comparing at least a portion of said input value with at least a portion of one or more stored values stored in respective ones of said plurality of memory rows so as to identify any memory row storing a stored value matching said input value;

a write means coupled to said plurality of memory rows for writing respective stored values therein;

a base value register means coupled to said comparator means for storing a base value corresponding to at least a portion of at least one of said stored values; and a comparator control means coupled to said comparator means for controlling:

(i) which portion of said input value is processed as a non-shared portion and compared by said comparator means with non-shared portions of said one or more stored values stored in respective ones of said plurality of memory rows; and (ii) which portion of said input value is processed as a shared portion and compared by said comparator means with a shared portion of said base value stored in said base value register; wherein said shared portion of said base value has a value matching corresponding portions of all of said stored values stored within said plurality of memory row means; and said non-shared portion of said input value has a value not matching corresponding non-shared portions of all of said one or more stored values stored within said plurality of memory row means.

The above, and other objects, features and advantages of this invention will be apparent from the following detailed description of illustrative embodiments which is to be read in connection with the accompanying drawings.

DESCRIPTION OF THE PREFERRED EMBODIMENTS

Figure 1:
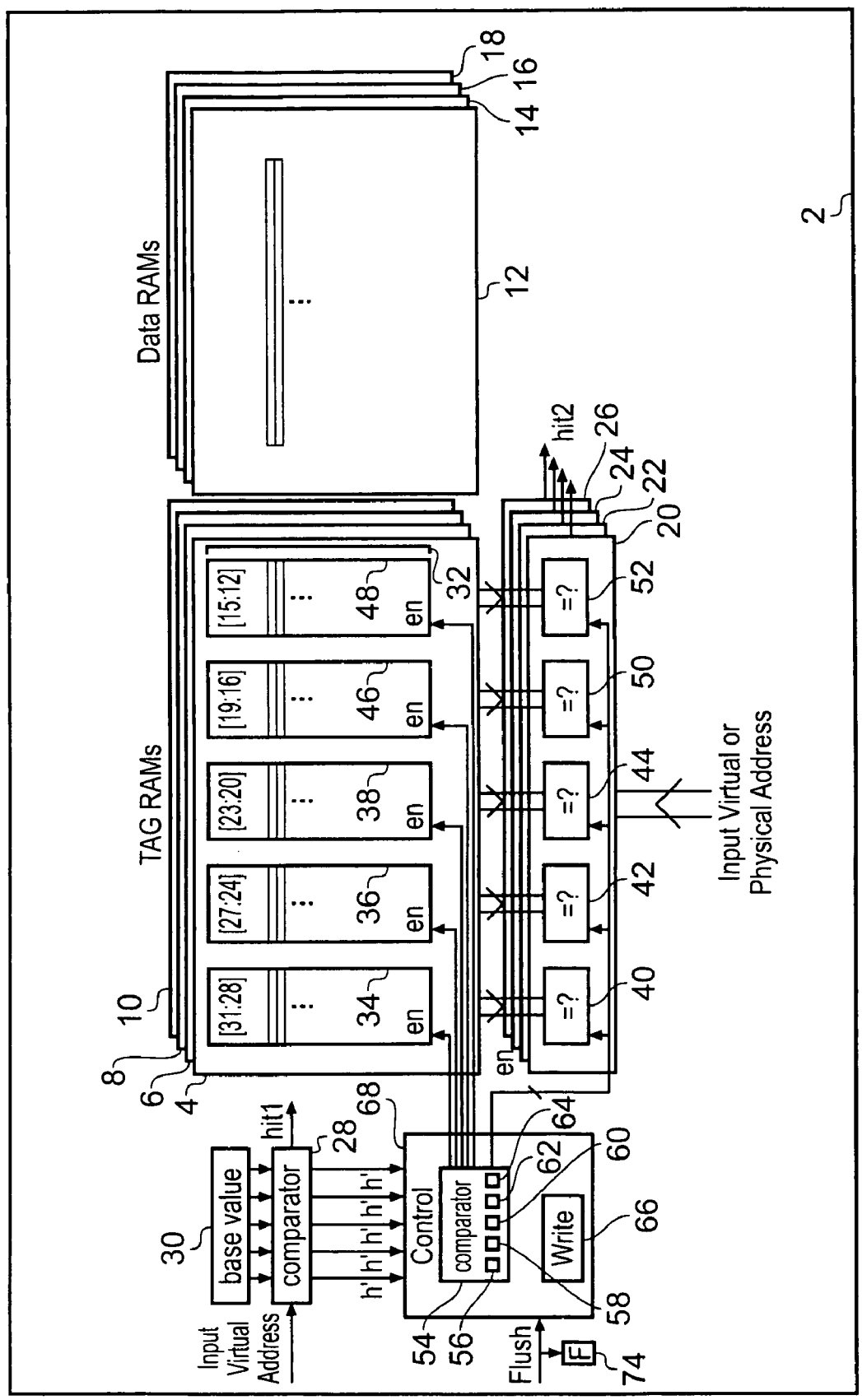
FIG. 1 schematically illustrates a multi-way cache.

FIG. 1 schematically illustrates a memory 2 in the form of a multi-way cache memory. This may, for example, be either an instruction cache memory or a data memory within a Harvard architecture system; Alternatively, the memory 2 may be a combined instruction and data memory (a von Neuman cache) within a processor system. It will be appreciated that a cache memory is only one example of the form of memory which may benefit from the present techniques The memory 2 is a 4-way memory with respective TAG RAMs 4, 6, 8, 10. These TAG RAMs 4, 6, 8, 10 are associated with corresponding data RAMs 12, 14, 16, and 18. The TAG RAMs 4, 6, 8, 10 and data RAMs 12, 14, 16, 18 provide a 4-way associative cache memory in which the data for a given memory address may be stored within any one of four memory rows respectively of the data RAMs 12, 14, 16, 18. The memory rows concerned are determined from a low order portion of the address which indexes into the appropriate rows of the TAG RAMs 4, 6, 8, 10. In these rows a TAG value which may or may not be the higher portion of the memory address concerned is stored and thus indicates whether or not the associated data value concerned is or is not cached within the data RAMs 12, 14, 16, 18.

In the example illustrated, the top twenty bits of a 32 bit memory address are stored within the TAG RAMs 4, 6, 8, 10. The comparison between an input virtual or physical address to be looked up within the cache memory 2 and the TAG values stored is performed by respective comparators circuitry 20, 22, 24, 26 for each of the TAG RAMs 4, 6, 8, 10. The comparator circuitry 20, 22, 24, 26 is responsible for comparing only those portions of the TAG values stored within the TAG RAMs 4, 6, 8, 10 which are not shared by all of the TAG values so stored. The shared portion of the TAG values stored is compared with the input virtual address by comparator circuitry 28 associated with a base value register 30 storing a base value. The different portions of the comparator circuitry 20, 22, 24, 26 and 28 are illustrated separately in this particular example embodiment, but it will be appreciated that they could be provided with one or more of these elements combined or with more elements, such as respective base value registers 30 and comparator circuitry 28 for each of the TAG rams (this can enable the possibility for some TAG RAMs to be locked down with critical code that is not in regular use).

As illustrated FIG. 1, the twenty bits of the TAG values are divided into five 4-bit portions which are treated as either shared or not shared. Thus, for a shared portion, all of the plurality memory rows 32 within the TAG RAM 4, 6, 8, 10 will have the same value for that portion and instead of comparing the corresponding bits of an input virtual address with the portion of the relevant TAG value as indexed by lower order portion of the virtual address, this shared portion can instead be checked against the corresponding portion of the base value stored within the base value register by the comparator circuitry 28. This saves energy accordingly, if, for example, the high order portion of the TAG values stored in bit positions [31:20] are all shared for each of the memory rows 32, then the sections 34, 36 and 38 of the TAG RAM 4 will not be enabled for comparison by the comparator circuitry 20 and the comparator blocks 40, 42 and 44 will not be used. The sections 46 and 48 within the TAG RAM 4 contain non-shared values and accordingly remain active and are read and compared by the comparison blocks 50, 52. In order to check that the input virtual address does indeed have its upper 12 bits corresponding to the values shared by the shared portion of the stored value, these upper twelve bits are compared in comparator circuitry 28 with the upper twelve bits of the base value stored within the base value register 30. In this way, the comparator control circuitry 54 is able to determine that the shared portion matches, such that this result (hit 1) can be ANDed with the comparison performed for the non-shared portion within the TAG RAMs 4, 6, 8, 10 (hit 2) and thus a combined hit signal generated which will either trigger a read within the relevant way of the data RAM 12, 14, 16, 18, or lead to cache miss and linefill. Latches 56, 58, 60, 62, 64 within the comparator control circuitry 54 control which of the portions of the stored values are treated as shared or non-shared and accordingly which of the comparison blocks 40, 42, 44, 50, 52 is active, and which of the sections of the TAG RAM 34, 36, 38, 46 and 48 are read, for any given comparison of an input electrical address.

If an input virtual address does not match those portions of the base value shared by all the proceeding stored values within the TAG RAMs 4, 6, 8, 10, as indicated by the mismatch detected by comparator circuitry 28, then the hit signals from this comparator circuitry 28 indicate this circumstance to the comparator control circuitry 54 and accordingly the corresponding latch 56, 58, 60, 62, 64 can be reset indicating that this portion of the stored value is no longer shared by all of the stored values within the TAG RAMs 4, 6, 8, 10. When the relevant data value having that non-matching address is fetched from the higher order memory systems, it is used to satisfy the cache miss as well as being written by write circuitry 66 into the cache 2 at that time. It will be normal that the shared portions and the non-shared portions will form contiguous regions of the stored values within the TAG RAMs 4, 6, 8, 10, i.e. the shared portion will typically be a continuous higher order portion of the stored TAG values, but this need not necessarily be the case depending upon the particular memory access characteristics of the system concerned.

As mentioned above, write circuitry 66 when writing a new stored value into the TAG RAMs 4, 6, 8, 10 in response to a cache miss will reset the appropriate ones of the latches 56, 58, 60, 62 and 64 which do not now correspond to portions of the TAG's having shared values for all the stored values within the TAG RAMs 4, 6, 8, 10. The comparator control circuitry 54 and the write circuitry 66 form part of a cache controller 68 which performs other control operations upon the cache memory to in the conventional manner.

Figure 2:
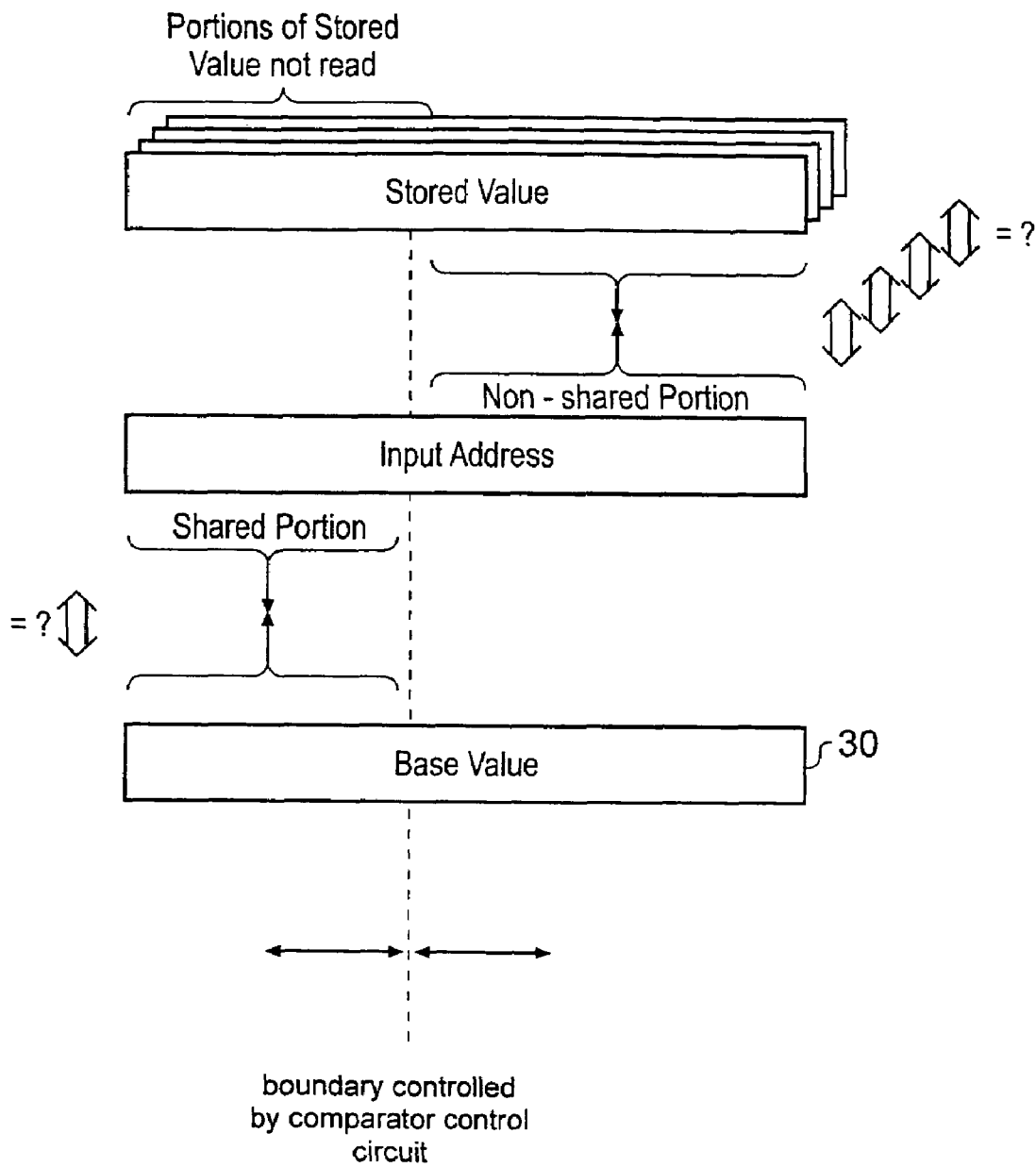
FIG. 2 schematically illustrates different portions of an input address being compared with a shared portion of a base value and with a non-shared portion of multiple stored values.

FIG. 2 schematically illustrates TAG comparisons performed with respect to an input address. A shared portion of the input address is compared against a base value stored within the base value register 30. The base value applies across all of the cache ways in this example embodiment. In alternative embodiments, separate base values can be provided for separate cache ways. In FIG. 1 the non-shared portion is compared by respective comparative circuitry 20, 22, 24, 26 against the stored values indexed by the lower order portion of the input virtual address in respect of the non-shared values within each of the indexed memory rows. The portions of the stored values which are shared are not read from the memory rows concerned. This is achieved by control of the enable signals supplied to each of the sections of the TAG RAM 34, 36, 38, 46, 48 by the comparator control circuitry 54 as illustrated in FIG. 1. The boundary between the shared portion and the non-shared portion is controlled by the comparator control circuitry 54 using the latches 56, 58, 60, 62, 64. This is illustrated as a single boundary in this example, although discrete multiple shared and non-shared portions are possible.

Figure 3A:
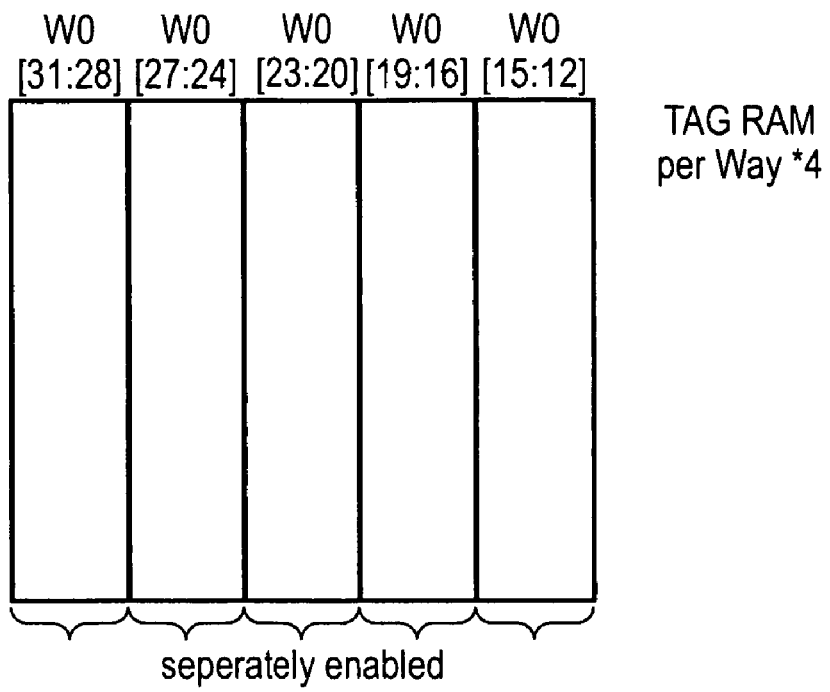
FIGS. 3A and 3B schematically illustrate two example illustrate embodiments of a TAG RAM arrangement.

FIG. 3A illustrates an example similar to that shown in FIG. 1 in which a TAG RAM is provided for each way of the cache memory 2. In the example shown, this is Way0 Each of five 4-bit sections of this TAG RAM can be separately enabled and disabled depending upon which portions of the stored values within that cache way are either shared all or at least one non-shared.

Figure 3B:
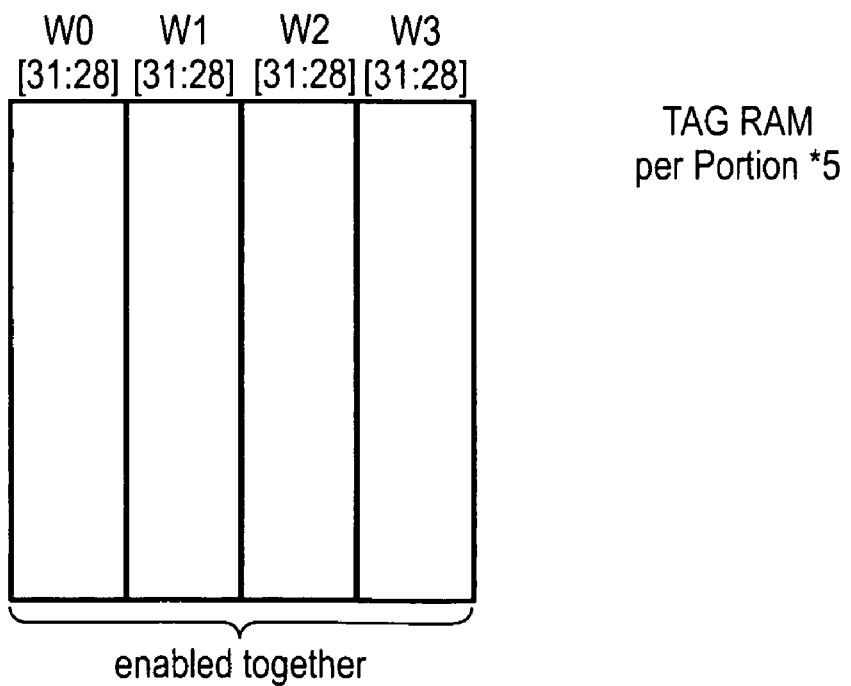

FIG. 3B illustrates an alternative arrangement in which separate TAG RAMs are provided for each portion which may be either shared or non-shared. Thus, in the example illustrated, the values for the bits [31:28] are shared by all values within the four cache ways concerned and accordingly these 4-bit portions are stored together within a single TAG RAM for that portion and thus either enabled or disabled together. This simplifies control and produces a more desirable aspect ratio for the TAG RAM. Since there will be five portions which can either be shared or non-shared in accordance with 20-bit TAGs divided into 4-bit portions, there will in example of FIG. 3B be five TAG RAMs even though this is a 4-way cache.

Figure 4:
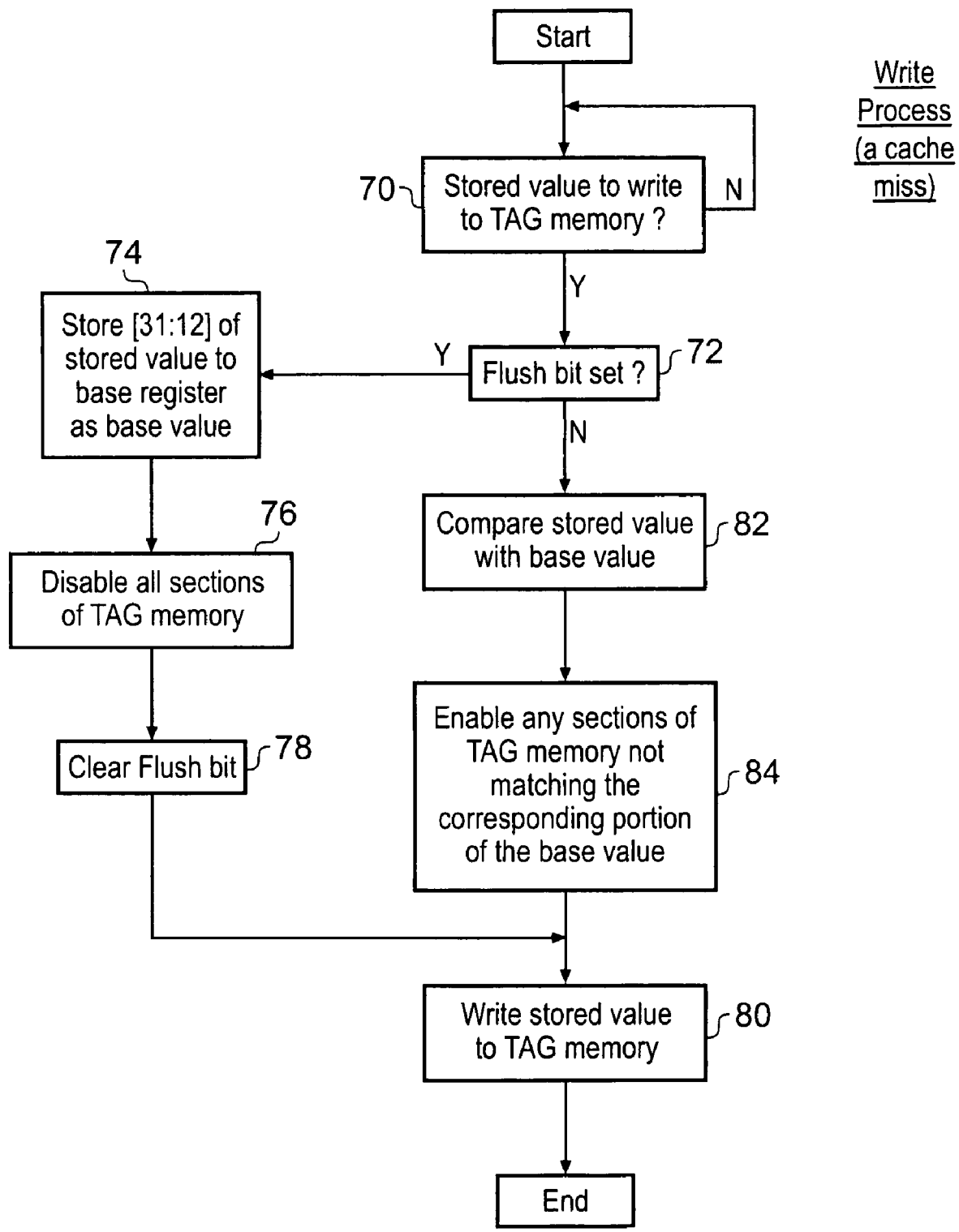
FIG. 4 is a flow diagram schematically illustrating the write process (e.g. a cache miss) to the cache memory of FIG. 1.

FIG. 4 is a flow diagram schematically illustrating the processing performed by the circuitry of FIG. 1 as part of a write process. At step 70 the process waits for a stored value to be written to memory. When such a stored value is received, step 72 determines whether a flush bit within a flush latch 74 (see FIG. 1) is set indicating that the cache memory 2 has just been flushed and accordingly contains no valid stored values. If the flush bit is set, then processing proceeds to step 74 where the upper twenty bits of the stored value (i.e. the TAG) are written into the base value register 30 to form the base value for subsequent processing (i.e. the value for which it is assumed that portions of that value will be shared by all of the stored values). Step 76 then disables all of the sections 34, 36, 38, 46, 48 of the TAG memory by setting the appropriate latches 56, 58, 60, 62, 64 since at the outset all portions of the first stored value to be written into the cache following a flush will be shared. Step 78 then clears the flush bit stored within the flush latch 74 and step 80 writes the stored value into the appropriately indexed row of the plurality of memory rows of the TAG RAM 4, 6, 8, 10.

If the determination at step 72 was that the flush bit is not set, then processing proceeds to step 82 which a comparison is made between the stored value to be written and the base value stored in the base register 30. For any portions of the stored value and base value which do not match, the corresponding sections 34, 36, 38, 46, 48 within the TAG RAMs 4, 6, 8, 10 are enabled since these will be sections which no longer share values for all of the valid TAG's stored values therein. This is performed at step 84. Thus, it will be seen that whilst initially all the sections 34, 36, 38, 46, 48 of the TAG RAM 4, 6, 8, 10 are disabled, these will be selectively enabled as further writes are made to the cache memory 2 and data stored therein when these new stored values have portions which do not match the corresponding portions of all previously stored values. Flushing the cache memory 2 normally takes place as a result of context switches and similar actions within processor operations and it is normal at this time for previously cached values no longer to be required and accordingly the behaviour of the cache memory 2 to be evicted and cleared.

Figure 5:
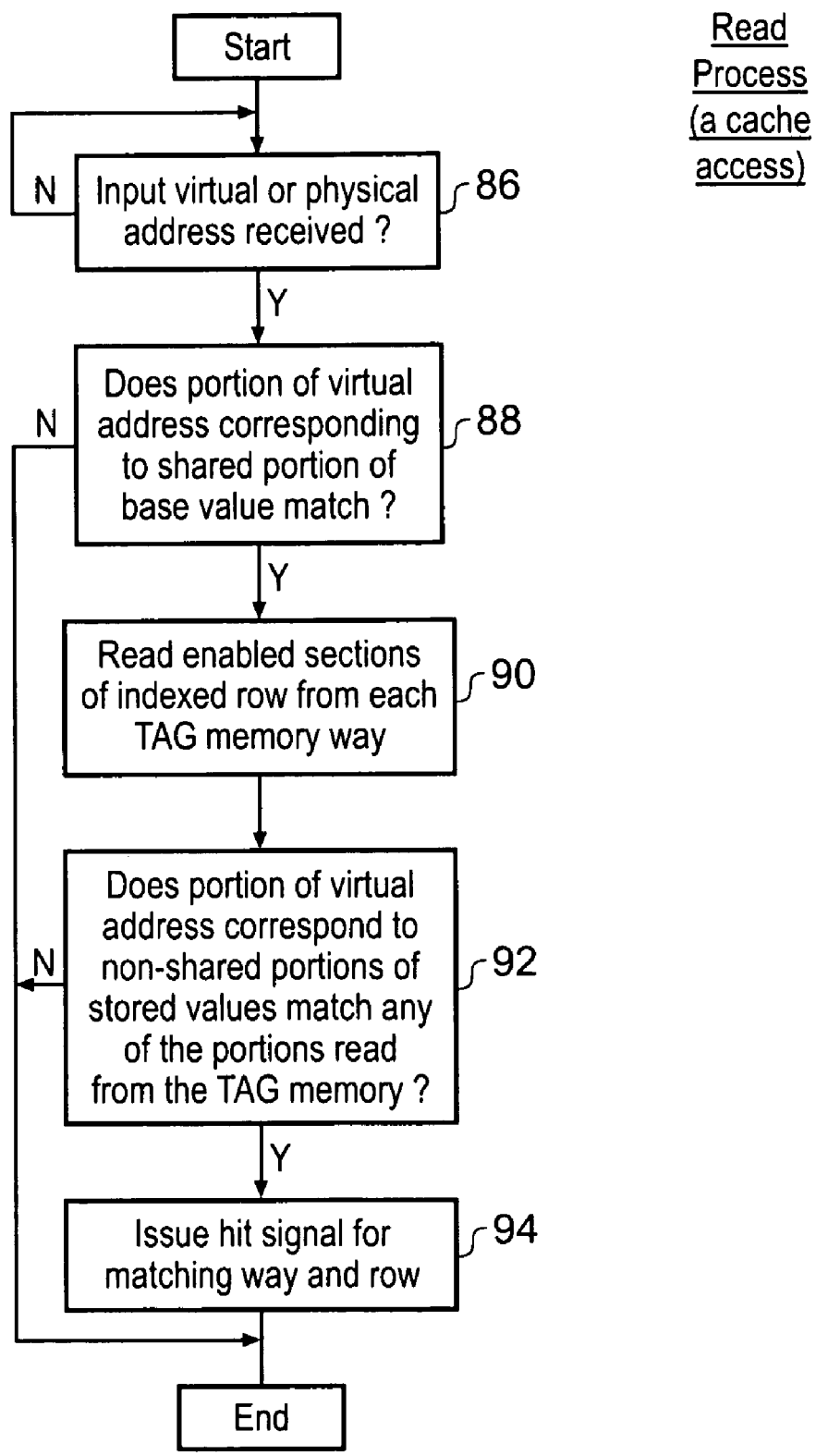
FIG. 5 is a flow diagram schematically illustrating the read process (e.g. a cache access) to the memory of FIG. 1.

FIG. 5 schematically illustrates the processing performed when reading the cache memory 2. At step 86, the cache memory 2 waits for any address to be received for reading. When such an address is received, then step 88 determines whether the portion of the address corresponding to the shared portion of the base value stored within the base register 30 matches, i.e. all the previously stored values within the cache memory share a value for that shared portion. If this condition is not met, then a miss is declared and a cache line fill will be performed under control of the write circuitry 66 with an appropriate setting of one or more of the latches 56, 58, 60, 62, 64 to indicate the now non-shared new portion or portions of the stored values.

If the comparison at step 88 indicated a match, then step 90 reads the enabled ones of the sections 34, 36, 38, 46, 48 of the TAG RAMs 4, 6, 8, 10. Since a reduced number of bits are accessed within the TAG RAMs 4, 6, 8, 10, less power is consumed. The comparison performed at step 88 by the comparator circuitry 28 with the base value stored within the base register 30 is comparatively power efficient and can use small, low power consumptions circuit elements. Step 92 determines whether the portion of the address corresponding to the non-shared portions of stored values for the indexed memory row matches any of those portions read from the respective TAG RAMs 4, 6, 8, 10. If there is no such match, then this indicates a cache miss and processing of the read again terminates with a subsequent cache line fill as described above. If the determination at step 92 was that one of the cache ways does contain a matching and non-shared portion of a stored value, then this is indicated at step 94 and an appropriate hit signal is issued to the corresponding one of the data RAM's 12, 14, 16, 18 so that the data values (cache line) corresponding to that input address can be output.

Figure 6:
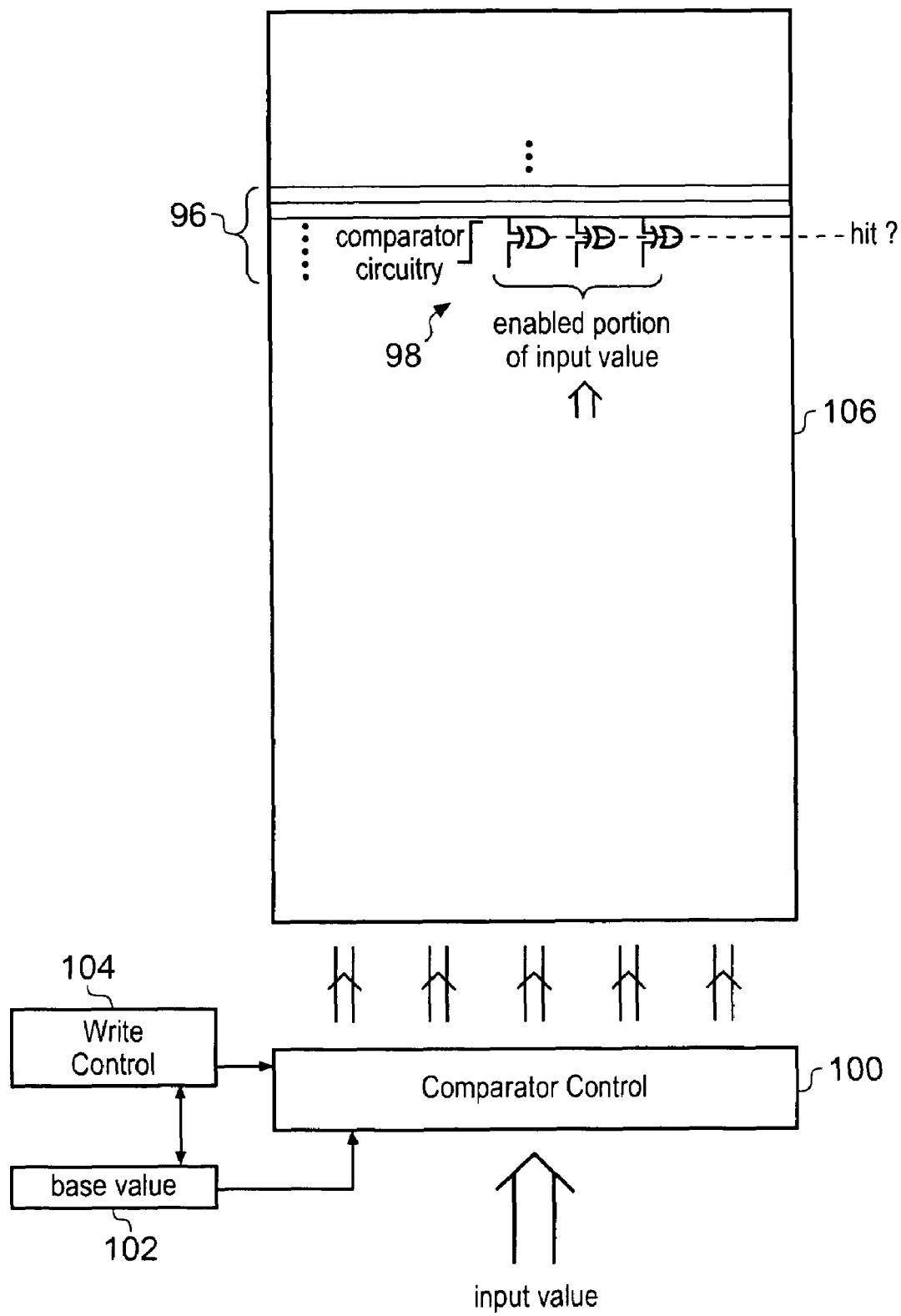
FIG. 6 schematically illustrates a CAM memory utilising the present techniques.

FIG. 6 schematically illustrates another form of memory to which the present technique can be applied. This is a general purpose content address or memory (CAM). This CAM memory contains multiple memory rows 96. An input value is compared by comparator circuitry 98 associated with each of the memory rows to determine whether the input value matches the stored value for that memory row. Portions of that comparator circuitry 98 are selectively enabled and disabled by comparator control circuitry 100 acting in conjunction with a base value register 102 storing a base value and write control circuitry 104. The base value 102 stores a base value which was the value of the first stored value to be written to the content addressable memory. When subsequent values are written to the content addressable memory under control of the write control circuitry 104, then if these share portions with all the currently stored values, then the comparator can control circuitry 100 will keep those shared portions of the comparator circuitry 98 for each memory row disabled so that only the non-shared portions will be subject to active comparison within the body of the content addressable memory 106. The comparison of the shared portions can be performed directly and more power efficiently using the base values stored within the base value register 102.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. A memory for storing a plurality of stored values and for comparing an input value to said plurality of stored values to generate a hit signal indicative of said input value matching one of said plurality of stored values, each of said stored values and said input value has a shared portion and a non-shared portion, and said shared portion of each stored value matches said shared portion of each other stored value and not all of said non-shared portions of said stored values match, said shared portions and said non-shared portions having a variable length, said memory comprising:

a plurality of memory rows for storing said plurality of stored values;

an updateable base value register, separate from said plurality of memory rows, for storing a base value, said base value has a shared portion corresponding in value and bit position to the shared portion of said plurality of stored values and corresponding in bit position to said shared portion of said input value, said base value has a non-shared portion corresponding in bit position to the non-shared portion of said plurality of stored values and said input value;

comparator circuitry coupled to said plurality of memory rows and to said updateable base value register and responsive to said input value, for identifying any memory row storing a stored value matching said input value and for generating a hit signal in response thereto, said comparator circuitry comprising:
(i) first comparator circuitry for comparing said non shared portion of said input value with said non-shared portions of said plurality of stored values; and
(ii) second comparator circuitry for comparing said shared portion of said input value with said shared portion of said base value; and
comparator control circuitry, coupled to said comparator circuitry, for adjustably controlling a boundary between the shared portions and the non-shared portions of said stored values and said base value.

2. A memory as claimed in claim 1, comprising write circuitry coupled to said plurality of memory rows for writing said plurality of stored values therein, wherein said comparator control circuitry is responsive to each stored value being written to one of said plurality of memory rows and said base value register to update said shared portion of said base value.

3. A memory as claimed in claim 1, wherein said shared portion of said base value is a contiguous portion thereof.

4. A memory as claimed in claim 3, wherein said shared portion of said base value is a high order bit portion thereof.

5. A memory as claimed in claim 1, wherein each of said plurality of memory rows is divided into a plurality of multi-bit portions, each of said plurality of multi- bit portions being processed as storing either a shared stored value or a non-shared stored value for all of said plurality of memory rows.

6. A memory as claimed in claim 5, wherein said comparator control circuitry selectively disables a multi-bit portion of all of said plurality of memory rows from being subject to a comparison by said comparator circuitry and being read when said multi-bit portion of all of said plurality of memory rows corresponds to at least a part of said shared portion of said base value.

7. A memory as claimed in claim 1, wherein said memory is part of a cache memory.

8. A memory as claimed in claim 7, wherein said memory is a cache TAG memory.

9. A memory as claimed in claim 7, wherein said cache memory is a multi-way cache memory with a TAG memory for each cache way.

10. A memory as claimed in claim 7, wherein said cache memory is a multi-way cache memory with a TAG memory for each portion of said plurality of stored values which can correspond to either a shared portion or a non-shared portion.

11. A memory as claimed in claim 7, wherein said base value is cleared when said cache memory is flushed.

12. A memory as claimed in claim 7, wherein said base value is set to match a first stored value written to said part of said cache memory.

13. A memory as claimed in claim 7, wherein said cache memory is one of an instruction cache and a data cache within an Harvard architecture.

14. A memory as claimed in claim 8, wherein said cache memory is a virtually addressed cache memory and said cache TAG memory stores virtual address TAGs.

15. A method of operating a memory for storing a plurality of memory rows for storing a plurality of stored values and for comparing an input value to said plurality of stored values to generate a hit signal indicative of said input value matching one of said plurality of stored values, each of said stored values and said input value has a shared portion and a non-shared portion, and said shared portion of each stored value matches said shared portion of each other stored value and not all of said non-shared portions of said stored values match, said shared portions and said non-shared portions having a variable length, said method comprising:
storing said plurality of stored values in said plurality of memory rows;
storing a base value in an updateable base value register separate from said plurality of memory rows, said base value has a shared portion corresponding in value and bit position to the shared portion of said plurality of stored values and corresponding in bit position to said shared portion of said input value, said base value has a non-shared portion corresponding in bit position to the non-shared portion of said plurality of stored values and said input value;
identifying any memory row storing a stored value matching said input value and for generating a hit signal in response thereto, said identifying step comprising:
(i) comparing said non shared portion of said input value with said non-shared portions of said plurality of stored values; and
(ii) comparing said shared portion of said input value with said shared portion of said base value; and
adjustably controlling a boundary between the shared portions and the non-shared portions of both said stored values and said base value.

16. A method as claimed in claim 15, including the further step of writing said plurality of stored values to respective ones of said plurality of memory rows, wherein in response to each stored value being written to one of said plurality of memory rows and to said base value, updating which part of said base value is said shared portion of said base value.

17. A method as claimed in claim 15, wherein said shared portion of said base value is a contiguous portion thereof.

18. A method as claimed in claim 17, wherein said shared portion of said base value is a high order bit portion thereof.

19. A method as claimed in claim 15, wherein each of said plurality of memory rows is divided into a plurality of multi-bit portions, each of said plurality of multi-bit portions being processed as storing either a shared stored value or a non-shared stored value for all of said plurality of memory rows.

20. A method as claimed in claim 19, comprising selectively disabling a multi-bit portion of all of said plurality of memory rows from being subject to a comparison and being read when said multi-bit portion of all of said plurality of memory rows corresponds to at least a part of said shared portion of said base value.

21. A method as claimed in claim 15, wherein said memory is part of a cache memory.

22. A method as claimed in claim 21, wherein said memory is a cache TAG memory.

23. A method as claimed in claim 21, wherein said cache memory is a multi-way cache memory with a TAG memory for each cache way.

24. A method as claimed in claim 21, wherein said cache memory is a multi-way cache memory with a TAG memory for each portion of said stored values which can correspond to either a shared portion or a non-shared portion.

25. A method as claimed in claim 21, wherein said base value is cleared when said cache memory is flushed.

26. A method as claimed in claim 21, wherein said base value is set to match a first stored value written to said part of said cache memory.

27. A method as claimed in claim 21, wherein said cache memory is one of an instruction cache and a data cache within an Harvard architecture.

28. A method as claimed in claim 22, wherein said cache memory is a virtually addresses cache memory and said cache TAG memory stores virtual address TAGs.

29. A memory for storing a plurality of stored values and for comparing an input value to said plurality of stored values to generate a hit signal indicative of said input value matching one of said plurality of stored values, each of said stored values and said input value has a shared portion and a non-shared portion, and said shared portion of each stored value matches said shared portion of each other stored value and not all of said non-shared portions of said stored values match, said shared portions and said non-shared portions having a variable length, said memory comprising:

a plurality of memory row means for storing said plurality of stored values;

an updateable base value register means, separate from said plurality of memory rows, for storing a base value, said base value means has a shared portion corresponding in value and bit position to the shared portion of said plurality of stored values and corresponding in bit position to said shared portion of said input value, said base value means has a non-shared portion corresponding in bit position to the non-shared portion of said plurality of stored values and said input value;

comparator means, coupled to said plurality of memory rows and to said updateable base value register and responsive to said input value, for identifying any memory row storing a stored value matching said input value and for generating a hit signal in response thereto, said comparator circuitry comprising:

(i) first comparator means for comparing said non shared portion of said input value with said non-shared portions of said plurality of stored values; and (ii) second comparator means for comparing said shared portion of said input value with said shared portion of said base value; and comparator control means, coupled to said comparator means, for adjustably controlling a boundary between the shared portions and the non-shared portions of said stored values and said base value.

* * * * *